United States Patent [19]

Halvis

[11] Patent Number: 4,727,259

[45] Date of Patent: Feb. 23, 1988

[54] MONOLITHIC AREA ARRAY WITH SHUTTER OPERABLE TO ONLY TRANSMIT LIGHT BETWEEN THE MINIMUM AND MAXIMUM RANGES FOR LASER RANGEFINDING

[75] Inventor: James Halvis, Arnold, Md.

[73] Assignee: The United States of America as represented by the Secretary of the Air Force, Washington, D.C.

[21] Appl. No.: 831,897

[22] Filed: Feb. 24, 1986

[51] Int. Cl.$^4$ .................................................. G01C 3/08
[52] U.S. Cl. ........................................ 250/561; 356/5
[58] Field of Search ................. 356/5, 4, 28; 250/201, 250/204, 560, 561

[56] References Cited

U.S. PATENT DOCUMENTS

| | | | |
|---|---|---|---|
| 4,125,835 | 11/1978 | Barry | 356/5 |
| 4,159,873 | 7/1979 | Farnsworth | 356/5 |
| 4,320,397 | 3/1982 | Constantinides | 343/7.5 |
| 4,380,391 | 4/1983 | Buser et al. | 356/5 |
| 4,380,755 | 4/1983 | Endlicher et al. | 382/68 |
| 4,498,105 | 2/1985 | Crawshaw | 358/213 |
| 4,518,256 | 5/1985 | Schwartz | 356/5 |
| 4,531,156 | 7/1985 | Nishizawa et al. | 358/213 |
| 4,634,272 | 1/1987 | Endo | 356/5 |
| 4,636,068 | 1/1987 | Niiho et al. | 356/5 |

Primary Examiner—David C. Nelms
Assistant Examiner—William L. Oen
Attorney, Agent, or Firm—William G. Auton; Donald J. Singer

[57] ABSTRACT

Laser ranging in a volume of interest is accomplished using a laser transmitter, a planar matrix of photosensitive optical elements, a memory, a display, and a mechanical or electronic shutter. The laser transmitter directs a pulsed laser towards the volume of interest. The mechanical or electronic shutter shields all light from the planar matrix of photosensitive optical elements except during an interval occuring between times corresponding to the minimum range and maximum range of this laser rangefinder. The photosensitive optical elements each produce an output signal to the memory when receiving target echo return signals from objects in the volume of interest. When the memory is a plurality of charge coupled device storage registers integral to the optical elements, then the receiver array has its own internal memory, which may be accessed to indicate the range values of objects within the volume of interest.

1 Claim, 4 Drawing Figures

MONOLITHIC AREA ARRAY WITH SHUTTER OPERABLE TO ONLY TRANSMIT LIGHT BETWEEN THE MINIMUM AND MAXIMUM RANGES FOR LASER RANGEFINDING

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to laser optical detection systems, and specifically to a monolithic area array of optical elements shielded by a mechanical or electronic shutter designed for low background laser ranging.

Laser rangefinders detect the range of remote objects by transmitting a pulse of light and detecting the echo return signal. The time-of-flight is measured to yield the range or distance between the target and the rangefinder. Exemplary of such systems are the devices disclosed in the following U.S. patents, which are incorporated herein by reference:

U.S Pat. No. 4,380,391 issued to Buser et al;
U.S. Pat. No. 4,380,755 issued to Endlicher et al;
U.S. Pat. No. 4,498,105 issued to Crawshaw;
U.S. Pat. No. 4,518,256 issued to Schwartz; and
U.S. Pat. No. 4,531,156 issued to Nishizawa et al.

Schwartz discloses an optical radar which includes a laser transmitter and an optical receiver. The receiver is described as an array of detectors which serve to divide up the field of view of the receiver into sectors about the boresight of the radar. Range is determined using the range bin channels.

Buser et al discuss a system for laser ranging and target identification and speak of observing the time broadened reflected signals that result from integration of the finite depths of the targets. Endlicher et al are concerned with a monolithically integrated two-dimensional image sensor having an array of sensor elements disposed in rows and columns connected by respective row and column lines. In Crawshaw a CCD imager is formed with an A register exposed to illumination and has B and C registers masked from illumination. Nishizawa et al disclose a solid state image pickup device which has an electronic shutter function.

Laser ranging systems use avalanche photodiodes as the sensing elements for returned signals. More recently, photodiodes coupled to charge coupled device (CCD) storage registers have been used as the detector elements. Both types of devices can be fabricated into monolithic linear arrays. Formation of area arrays has required hybrid assembly. Some schemes have been proposed for forming monolithic area arrays, but, these methods require complex manufacturing processes and are limited to a few rows of detectors.

In view of the foregoing discussion, it is apparent that there currently exists the need for large area detector arrays for laser ranging. The present invention is intended to satisfy that need.

SUMMARY OF THE INVENTION

The present invention is a monolithic array with a mechanical or electronic shutter which may be used to obtain laser ranging for remote targets. One embodiment of the present invention performs rangefinding using: a laser transmitter, a receiver, and a mechanical or electronic shutter.

The laser transmitter may be one selected from the referenced prior art. The receiver is the monolithic area array composed of an array of CCD photodiodes which also function as CCD storage registers. The mechanical or electronic shutter shields the receiver from all light, except at selected intervals. In one such interval, the shutter opens at a time corresponding to the minimum range of the laser and closes at a time corresponding to the maximum range.

The monolithic array, as described above, requires less drive electronics since the receiver is a monolithic instead of a hybrid circuit. Additionally, fewer storage elements are necessary since the elements function as both sensors and storage registers.

It is a principal object of the present invention to provide a monolithic area array for laser ranging applications.

It is another object of the present invention to provide a means of low background target detection, such as space-based missile defense.

It is another object of the present invention to provide a laser ranging system which requires less drive electronics and fewer storage elements than conventional systems.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a monolithic area array which may be used for laser rangefinding.

Figure 1:
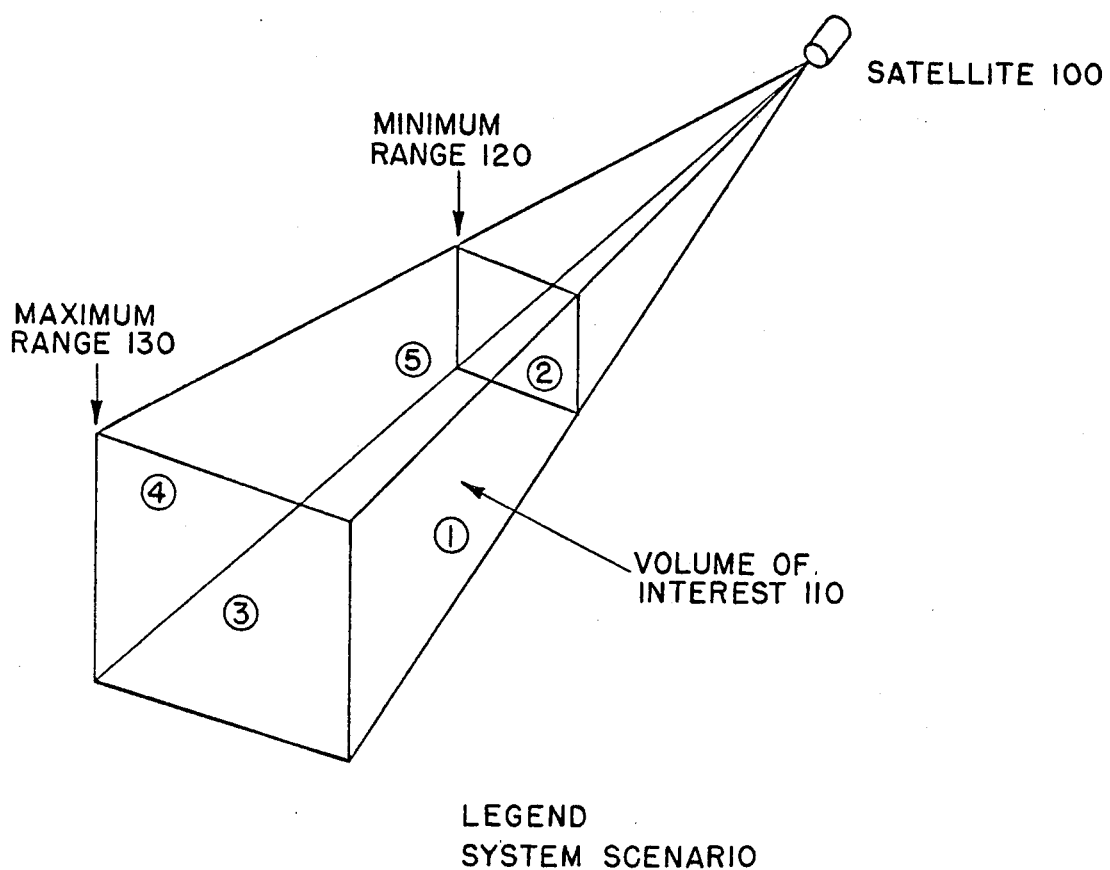
FIG. 1 illustrates the low background environment of a space-based missile defense system.

The reader's attention is now directed towards FIG. 1, which illustrates the low background environment of a space-based missile defense system. In FIG. 1, the present invention is applied to laser ranging from a satellite 100. The volume of interest 110 is defined by the laser beam-width geometry between the minimum range 120 and the maximum range 130 of the laser rangefinder. FIG. 1 depicts five targets 1–5 within the volume of interest.

Figure 2:
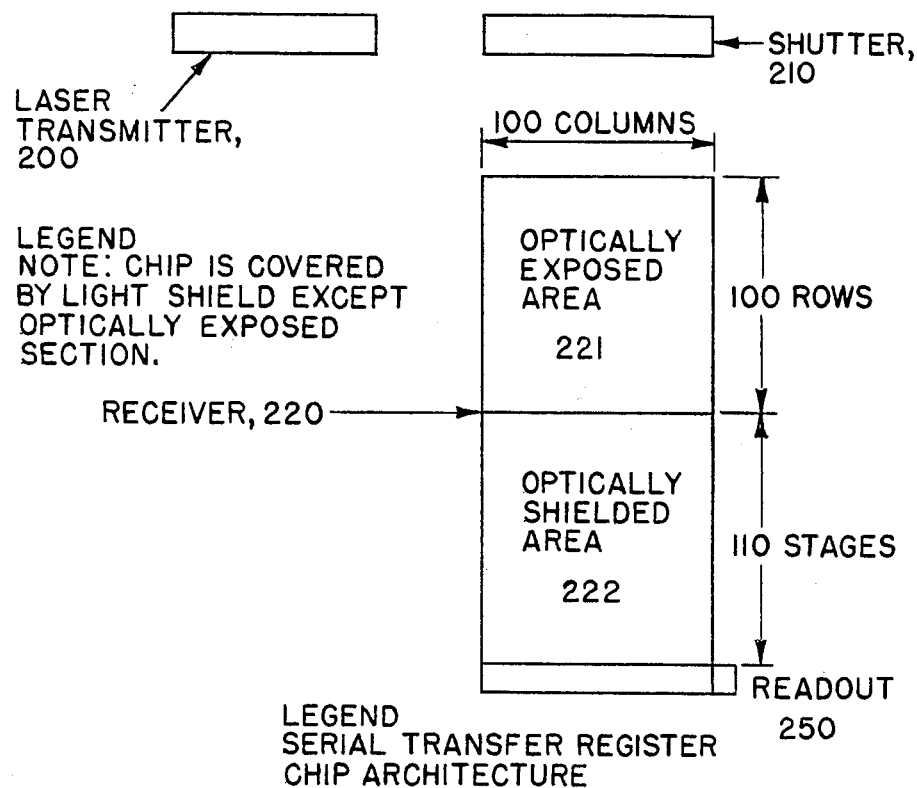
FIG. 2 is a block diagram of a laser rangefinder system using the present invention.

FIG. 2 is a block diagram of a laser rangefinder application of the present invention. The three principal components are: a laser transmitter 200, the mechanical or electronic shutter 210, and the receiver 220.

The laser transmitter 200 may be one selected from the referenced prior art. However, it is important to note that laser rangefinders generally operate in one of two modes. One mode may be a continuous wave (CW) operation where the relative phase between the transmitted optical signal and the reflected signal determine the roundtrip time between the target and the transmitter. The other method is to use a pulsed laser which emits a pulse with a fast rising edge or falling edge, or both. The time-of-flight is measured which provides the distance between the target and the transceiver. The laser rangefinder application of the present invention uses the pulse mode for the detection of remote targets.

The mechanical or electronic shutter 210 of FIG. 2 shields the receiver 220 from all light except for the interval between minimum range and maximum range. Minimum range may be defined as the amount of time it takes light from the laser transmitter to transmit out and back from either the closest target or the beginning of the volume of interest. This mechanical or electronic shutter need not be described in further detail since similar applications, such as the one of Nishizawa et al, exist in the art.

The receiver 220 of FIG. 2, is composed of the monolithic area array of the present invention. This monolithic area array includes an imaging matrix 221 of 100×100 photosensitive picture elements, which detect target echo return signals from the volume of interest.

As depicted in FIG. 2, the monolithic area array includes its own internal memory 222. This memory is depicted as 110 stages of light-shielded storage bins, which are electrically connected to the imaging matrix of picture elements 221. The memory 222 receives and stores signals produced by the imaging matrix of photosensitive elements when they receive target echo return signals. The delay times of the target echo return signals indicate the range of the targets within the volume of interest.

Note that one memory may be accessed through the readout 250, which allows the acquired data to be displayed to the system user.

Figure 3:
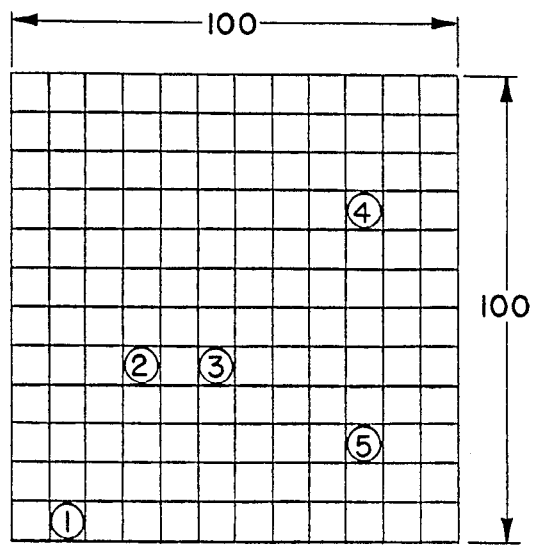
FIG. 3 is a two-dimensional representation of the volume of interest.

The operation of the rangefinder of FIG. 2 is as follows. The volume of interest in FIG. 1 is illuminated by a high power short pulse width laser 200. The mechanical or electronic shutter 210 which shields the receiver from light is opened at a time corresponding to the minimum range time for a reflected pulse. The shutter 210 is closed at a time corresponding to maximum range. The signal received and stored in the imaging section during the integration time is rapidly transferred to the storage section and each line read out sequentially. The receiver now has a two-dimensional representation of the volume of interest (FIG. 3).

Figure 4:
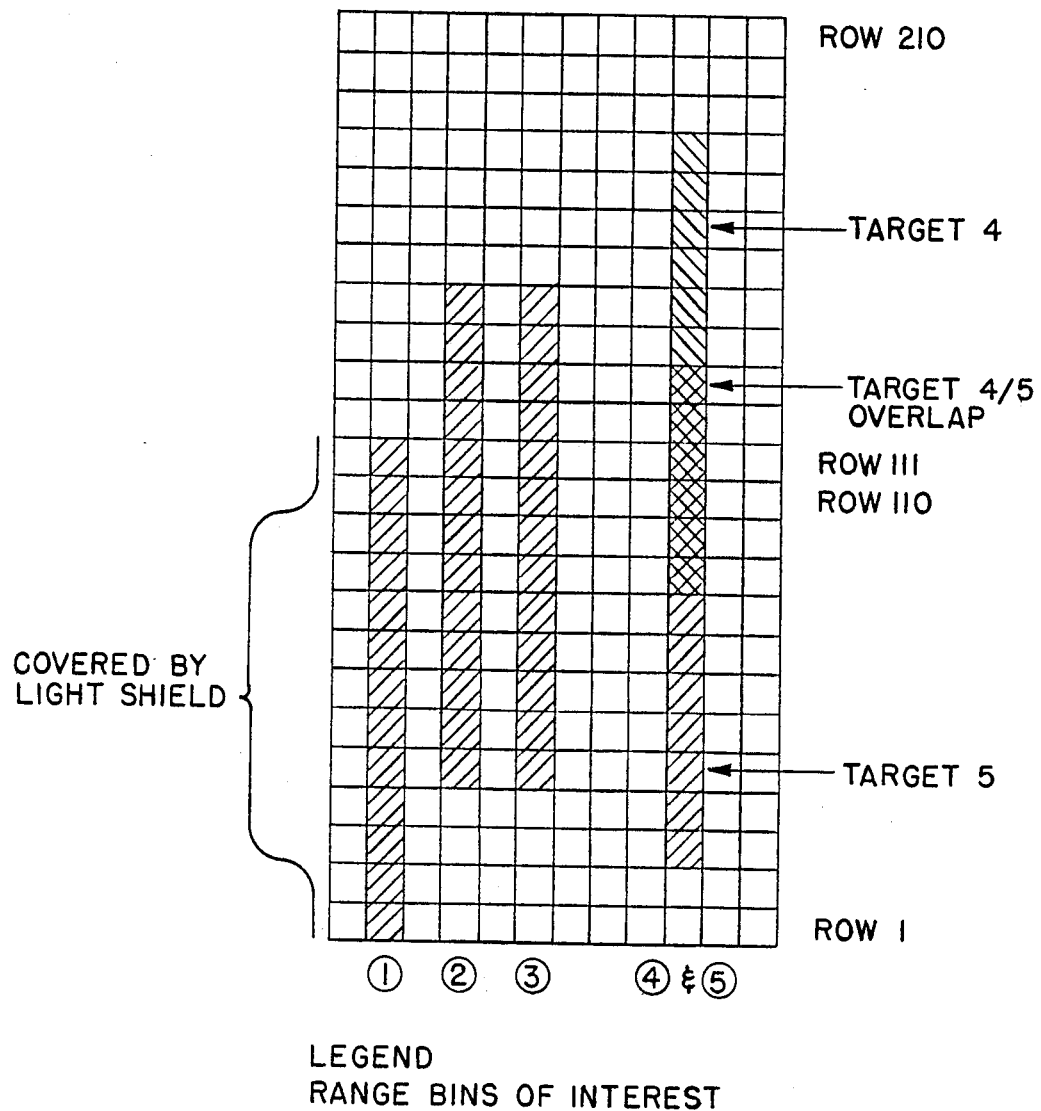
FIG. 4 depicts the range bins of interest of the memory of FIG. 2 as they depict the range values of the targets of FIG. 1.

The volume of interest is again illuminated by a laser. There should be little relative motion for high Pulse Repetition Frequency (PRF) lasers. The shutter is opened at a time corresponding to minimum range. During the "integration" time the receiver is rapidly clocked to transfer charge toward the output register. This, in effect, is a transient (time) recording of the reflected signals. After 110 vertical transfers, corresponding to maximum range, the shutter is closed. Knowing where each target is located in two-dimensions, 110 range bins for each target (FIG. 4) can be defined. The shaded areas correspond to possible range bins for each target.

For the example shown in FIG. 1, the range of targets 1, 2 and 3 can be determined directly by taking the range bin difference between the target return signal and the first possible range bin. A 25 MH$_z$ transient recording rate would give 6 meter resolution. A signal in the 10th possible range bin of interest would be at a range of:

RANGE (MIN)+(10×6 meters).

Targets 4 and 5 are in the same column. The range bins of interest for each target can overlap. As long as both targets are not located in the overlap region the targets can be distinguished by their range bin location. If both targets 4 and 5 are located in the overlap range bin region, they can still be distinguished by comparing their signal amplitudes to the signal amplitudes recorded during the two-dimensional imaging frame.

Some applications with a reflective background are also possible. However, the signal processing requirements would increase and several image frames might be required to accurately reconstruct the scene.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with a laser transmitter which transmits a laser pulse towards a volume of interest, said volume of interest being within a minimum range value and a maximum range value from said laser transmitter, a monolithic area array which receives target echo return signals from objects within said volume of interest for laser ranging, said monolithic area array comprising:

a planar matrix of photosensitive charge coupled device optical elements which produce and store a signal charge when receiving said target echo return signals, said signal charge having delay times which indicate range values for said objects within said volume of interest, said planar matrix of photosensitive charge coupled device optical elements having its own integral memory, wherein said integral memory comprises a plurality of charge coupled device storage registers which are each integral with the photosensitive charge coupled device optical elements in the planar matrix, said plurality of charge coupled device storage registers thereby providing the monolithic area array with its own internal memory which receives and stores target echo return signals which indicate the range values of objects within the volume of interest;

a means of reading out data which is electrically connected to said integral memory of said planar matrix of photosensitive charge coupled device optical elements and allows acquired data to be read by users of said monolithic area array; and a shutter which enclosed said planar matrix of photosensitive charge coupled device optical elements at all times excepting a selected interval, said shutter preventing light from reaching said planar matrix of photosensitive charge coupled device optical elements when closed, and allowing light to reach the planar matrix of photosensitive charge coupled device optical elements during the selected interval, said selected interval being between a first and second time value, the first time value being an amount of time the laser pulse would take to travel from the laser transmitter to the minimum range value and return, the second time value being an amount of time the laser pulse would take to travel from the laser transmitter to the maximum range value and return, said shutter thereby shielding said planar matrix from all light except for said selected interval when said target echo return signals are received between said minimum range value and said maximum range value of said volume of interest.

* * * * *